(12) United States Patent
Shirai

(10) Patent No.: US 10,089,730 B2
(45) Date of Patent: Oct. 2, 2018

(54) IMAGE PROCESSING APPARATUS AND IMAGE PROCESSING METHOD

(71) Applicant: CANON KABUSHIKI KAISHA, Tokyo (JP)

(72) Inventor: Kunihiro Shirai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/238,264

(22) Filed: Aug. 16, 2016

(65) Prior Publication Data

US 2017/0053386 A1    Feb. 23, 2017

(30) Foreign Application Priority Data

Aug. 20, 2015    (JP) ................................ 2015-162363

(51) Int. Cl.
*G06K 9/40*    (2006.01)
*G06T 5/20*    (2006.01)
*G06T 5/00*    (2006.01)

(52) U.S. Cl.
CPC ............... *G06T 5/20* (2013.01); *G06T 5/003* (2013.01)

(58) Field of Classification Search
CPC .................................. G06T 5/20; G06T 5/003
See application file for complete search history.

(56) References Cited

U.S. PATENT DOCUMENTS

| 8,223,244 | B2* | 7/2012 | Ono | G03B 7/095 348/335 |
| 8,508,613 | B2* | 8/2013 | Ono | H04N 5/2173 348/222.1 |
| 2007/0206885 | A1* | 9/2007 | Wen | H04N 5/2352 382/312 |
| 2010/0310165 | A1* | 12/2010 | Chen | G06T 5/003 382/167 |
| 2011/0298942 | A1* | 12/2011 | Uchida | H04N 5/232 348/222.1 |
| 2016/0119560 | A1* | 4/2016 | Hayashi | H04N 5/23212 348/241 |
| 2016/0150161 | A1* | 5/2016 | Irie | G06T 5/003 348/229.1 |

FOREIGN PATENT DOCUMENTS

JP    2009-033561 A    2/2009
JP        5546229 B2    7/2014

* cited by examiner

*Primary Examiner* — Gregory M Desire
(74) *Attorney, Agent, or Firm* — Cowan, Liebowitz & Latman, P.C.

(57) ABSTRACT

An image processing apparatus includes a first obtaining unit that obtains an image pickup condition of a shot image, a second obtaining unit that obtains information on an optical transfer function based on the image pickup condition, and a processor that generates an image restoration filter using the information on the optical transfer function and performs image processing on the shot image using the image restoration filter. The processor performs the image processing on the basis of information on noise characteristics of the image pickup condition.

21 Claims, 9 Drawing Sheets

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

Due to diffraction and an aberration generated in an image pickup optical system, light emitted from one point of an object has a minute spread without converging on one point. Distribution having such a minute spread is referred to as "a Point Spread Function (PSF)". Due to the image pickup optical system, a shot image formed based on an object image convolved with the PSF is blurred and thereby deteriorates a resolution.

A shot image has been widely stored as electronic data, and a technique (hereinafter referred to as "an image restoration technique") correcting image deterioration based on an optical system using image processing has been proposed. However, when an image where a resolution especially largely deteriorates is restored using the image processing, a correction quantity enlarges and noise data also increases with restoration processing. Accordingly, performing the restoration processing may be unfavorable depending on a noise quantity of an original image.

Japanese Patent No.5546229 discloses a correcting method that, of optical deteriorated information, a PTF (Phase Transfer Function) component is corrected using image restoration processing and a MTF (Modulation Transfer Function) is corrected using sharpness processing. Japanese Patent Laid-Open No.2009-033561 also discloses a method that constantly maintains a filter gain during an image restoration to constantly maintain a quality of an image corrected using image restoration processing and a method that changes a standard value for determining a quality according to a value of a restoration gain.

However, the method of Japanese Patent No.5546229 improves a phase component (PTF), but makes an amplitude component (MTF) dependent on the sharpness processing. Especially, in the case of an image having many noises, edge accuracy of detection lowers and thus a desired restoration effect is not obtained. Additionally, the method of Japanese Patent Laid-Open No.2009-033561 cannot obtain an optimum result with respect to an image imaged in various image pickup states liked an image imaged by a digital camera.

SUMMARY OF THE INVENTION

In view of the above problems, the present invention provides an image processing apparatus, an image pickup apparatus, a program, a program, a non-transitory computer-readable storage medium and an image processing method capable of obtaining a favorable corrected image according to optical characteristics while maintaining a restoration effect.

An image processing apparatus as one aspect of the present invention includes a first obtaining unit that obtains an image pickup condition of a shot image, a second obtaining unit that obtains information on an optical transfer function based on the image pickup condition, and a processor that generates an image restoration filter using the information on the optical transfer function and performs image processing on the shot image using the image restoration filter, wherein the processor performs the image processing on the basis of information on noise characteristics of the image pickup condition.

An image processing method as another aspect of the present invention includes a step of obtaining an image pickup condition of a shot image, a step of obtaining information on an optical transfer function based on the image pickup condition, a step of generating an image restoration filter using the information on the optical transfer function, and a step of performing image processing on the shot image using the image restoration filter, wherein the image processing is performed on the basis of information on noise characteristics of the image pickup condition.

Further features and aspects of the present invention will become apparent from the following description of exemplary embodiments with reference to the attached drawings.

DESCRIPTION OF THE EMBODIMENTS

Figure 1:
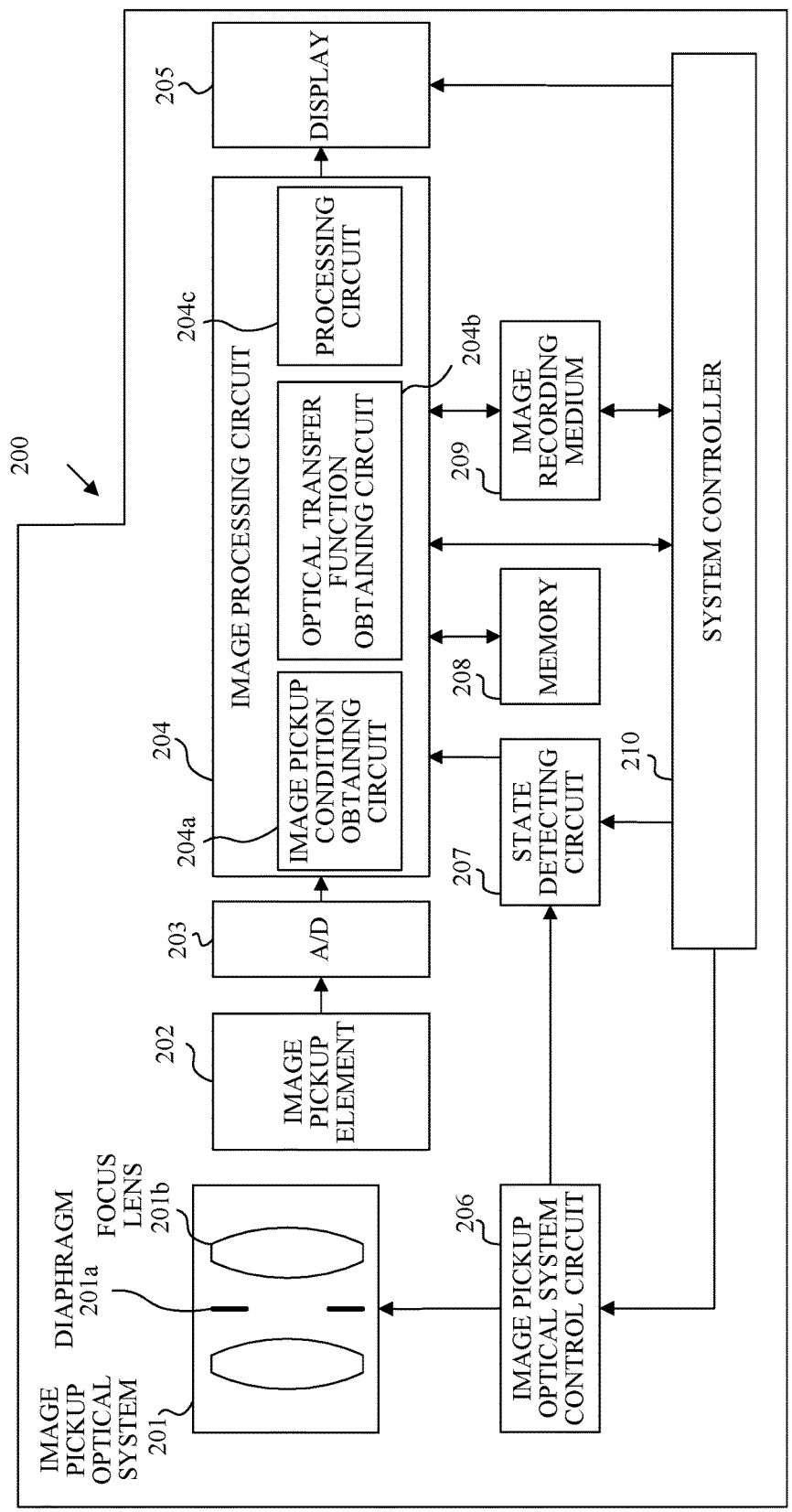
FIG. 1 is a block diagram of an image pickup apparatus including an image processing apparatus according to an embodiment of the present invention.

Exemplary embodiments of the present invention will be described below with reference to the accompanying drawings. In each of the drawings, the same elements will be denoted by the same reference numerals and the duplicate descriptions thereof will be omitted.

First of all, the definitions of terms and image restoration processing (image processing method) which are used in this embodiment will be described. The image restoration processing described in this embodiment is used as appropriate in each embodiment described later.

[Input Image]

An input image is a digital image (a shot image, or an original image) obtained by receiving light with an image pickup element via an image pickup optical system, and is deteriorated by an optical transfer function OTF depending on an aberration of the image pickup optical system including a lens and various optical filters. The image pickup optical system can be configured to use not only a lens, but also a mirror (a reflection surface) having a curvature.

An input image has, for example, information on an RGB color component. In addition to this color component, a color space, such as lightness, hue, and chroma which are expressed by LCH, lightness expressed by YCbCr, and a color-difference signal, can be selected to use as color components. As alternative types of color spaces, XYZ, Lab, Yuv, and JCh can also be used. Furthermore, a color temperature may be used.

An input image or an output image can be accompanied by an image pickup condition, such as a focal length of a lens, an aperture value, and an object distance, and various correction information used to correct these images. When correction processing is performed for an original image which is transmitted from an image pickup apparatus to an image processing apparatus, it is preferable for the original image to be accompanied by an image pickup condition and information on correction, as mentioned above. As another method, the image pickup apparatus and the image processing apparatus may be directly or indirectly connected to each other to receive and transmit an image pickup condition and information on correction between them.

[Image Restoration Processing]

Subsequently, an outline of image restoration processing will be described. The following Expression (1) is satisfied where g(x, y) is an original image (a deteriorated image), f(x, y) is an original image, and h(x, y) is a point spread function (PSF), which is a Fourier pair of an optical transfer function (OTF).

$$g(x,y)=h(x,y)*f(x,y) \qquad (1)$$

In Expression (1), symbol * denotes a convolution (convolution integration, or convolution sum-product), and symbol (x, y) denotes coordinates on the original image.

G(u, v) represented by Expression (2) represented by the product of each frequency is obtained by the Fourier transform of g(x, y) represented by Expression (1) to convert to a display format on a frequency surface.

$$G(u,v)=H(u,v)\cdot F(u,v) \qquad (2)$$

In Expression (2), H is an optical transfer function OTF obtained by the Fourier transform of the point spread function PSF(h), G and F are functions obtained by the Fourier transform of the deteriorated image g and the original image f, respectively, and (u, v) is coordinates on a two-dimensional frequency surface, that is, a frequency.

To obtain the original image f from the deteriorated shot image g, both sides of Expression (2) only have to be divided by the optical transfer function H, as in the case of the following Expression (3).

$$G(u,v)/H(u,v)=F(u,v) \qquad (3)$$

After that, when the reverse Fourier transform is performed for F(u, v), that is, G(u, v)/H(u, v) to reconvert the frequency surface to a real surface, the original image f(x, y) can be obtained as a restored image.

When R is generated by performing the reverse Fourier transform for $H^{-1}$, the original image f(x,y) can be also obtained by performing convolution processing with respect to the image on the real surface as the following Expression (4).

$$g(x,y)*R(x,y)=f(x,y) \qquad (4)$$

In Expression (4), R(x, y) is called as an "image restoration filter". If an image is a two-dimensional image, in general, an image restoration filter R also has a tap (cell) corresponding to each pixel of the image and thus has a distribution of two-dimensional filter values. Generally, the larger the tap number (the number of cells) of the image restoration filter R, the higher the restoration accuracy is. Therefore, a feasible tap number is set according to image quality, image processing capability, aberration characteristics and the like required. Since the image restoration filter R needs to reflect at least aberration characteristics, it is different from a conventional edge-enhanced filter (a high-pass filter) with about three taps (horizontal and vertical taps) or the like. Since the image restoration filter R is set based on an optical transfer function OTF, both of deteriorations of an amplitude component and a phase component can be highly accurately corrected.

Since an actual image contains a noise component, the use of the image restoration filter R created by an inverse of the optical transfer function OTF results in a significant amplification of the noise component with a restoration of the deteriorated image. The reason for this is that an MTF (an amplitude component) of the optical system is boosted such that its value returns to one over all frequencies from a state in which a noise amplitude is added to the amplitude of the image. The value of the MTF, which is an amplitude deterioration of the optical system, returns to one, but the power spectral of the noise is boosted at the same time. As a result, the noise is inevitably amplified depending on the degree of boosting of the MTF (restoration gain).

Thus, if an original image contains a noise, a satisfactory restored image as an image intended to be appreciated cannot be obtained. This is represented by the following Expressions (5-1) and (5-2).

$$G(u,v)=H(u,v)\cdot F(u,v)+N(u,v) \qquad (5-1)$$

$$G(u,v)/H(u,v)=F(u,v)+N(u,v)/H(u,v) \qquad (5-2)$$

In Expressions (5-1) and (5-2), N is a noise component.

With regard to an image containing a noise component, the method of controlling the degree of its restoration according to the strength ratio SNR of an image signal and a noise signal, as in the case of the Wiener filter represented by the following Expression (6), is known.

$$M(u, v) = \frac{1}{H(u, v)} \frac{|H(u, v)|^2}{|H(u, v)|^2 + C} \qquad (6)$$

In Expression (6), M(u, v) is frequency characteristics of the Wiener filter, |H(u, v)| is an absolute value (MTF) of an optical transfer function OTF, and C is a constant. In this method, a restoration gain (the degree of restoration) is set, for each frequency, in proportion to a value of the MTF. Generally, an MTF of an image pickup optical system has higher values in low frequencies and lower values in high frequencies. In this method, substantially, the restoration gain in the high frequencies of an image is reduced.

Figure 2:
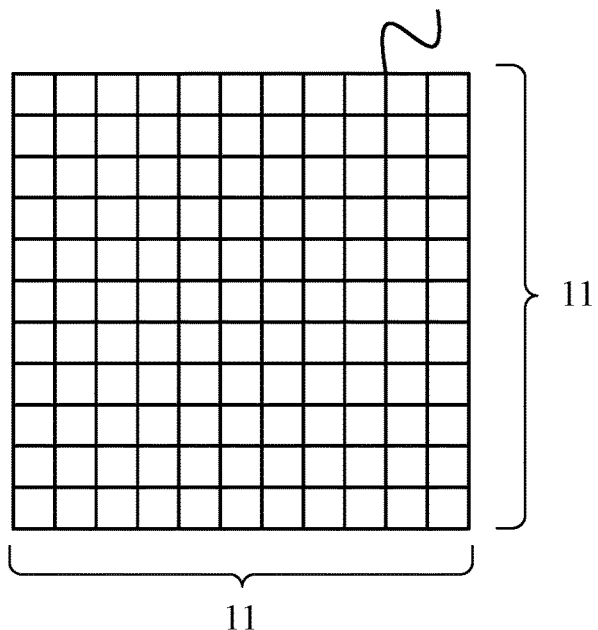
FIG. 2 is an explanatory diagram of an image restoration filter.
Figure 3:
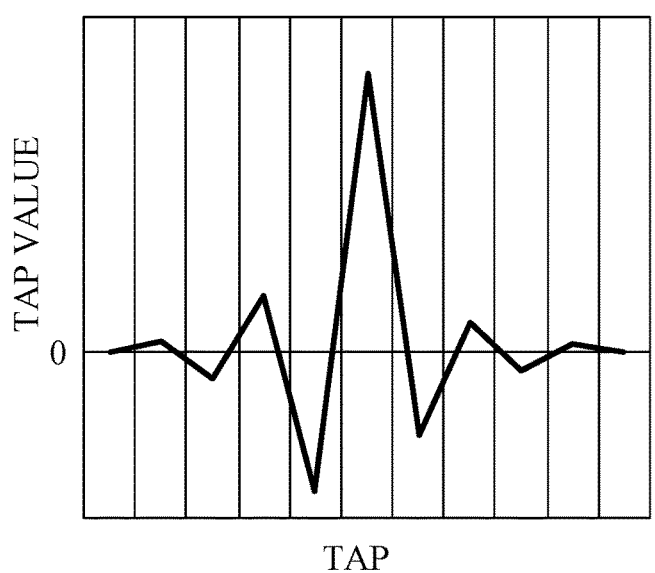
FIG. 3 is an explanatory diagram of an image restoration filter.

Subsequently, referring to FIGS. 2 and 3, an image restoration filter will be described. A tap number of an image restoration filter depends on aberration characteristics of an image pickup optical system and on a required restoration accuracy. The image restoration filter illustrated in FIG. 2 as an example is a two-dimensional filter having an 11×11 tap. In FIG. 2, while a value in each tap is omitted, one cross section of this image restoration filter is illustrated in FIG. 3. A distribution of values of each tap (coefficient value) of the image restoration filter ideally has a function of reconstructing a signal value (PSF) spatially spread due to the aberration as an original point.

Each tap of the image restoration filter is subjected to convolution processing (convolution integration/convolution sum-product) in an image restoration processing step depending on each pixel of an image. In the convolution processing, to improve the signal values of predetermined pixels, the predetermined pixels are arranged to coincide with the center of the image restoration filter. Then, for the image and its corresponding pixel values of the image restoration filter, each signal value of the image is multiplied by each coefficient value of the image restoration filter. Finally, the original signal values are replaced by the resulting total sum as the signal value of a center pixel.

Figures 4A, 4B:
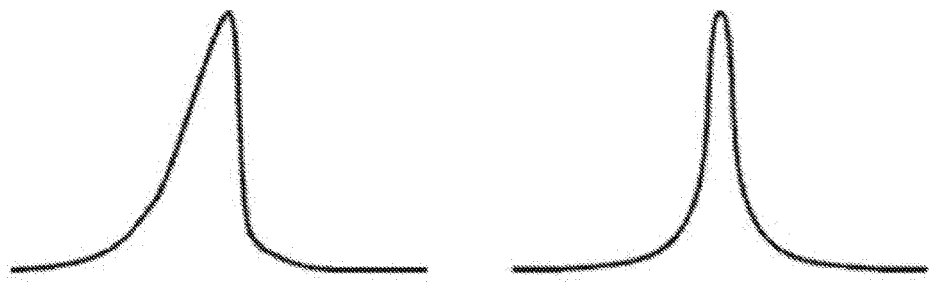
FIGS. 4A and 4B are explanatory diagrams of a point spread function.
Figure 5A:
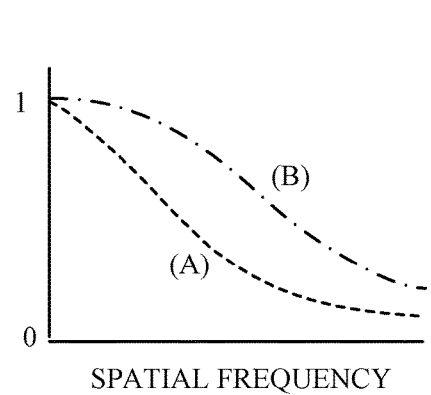
FIGS. 5A and 5B are an explanatory diagram of an amplitude component and a phase component of an optical transfer function.
Figure 5B:
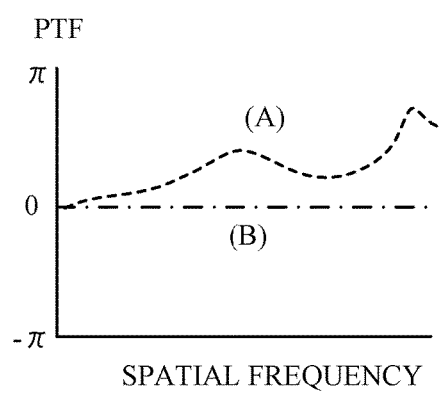

Subsequently, referring to FIGS. 4A, 4B, 5A and 5B, image restoration characteristics observed in a real space and a frequency space will be described. FIGS. 4A and 4B are explanatory diagrams of a point spread function PSF. FIG. 4A illustrates a point spread function PSF observed when an image is not restored, and FIG. 4B illustrates a PSF observed when the image is restored. FIGS. 5A and 5B are an explanatory diagram of an amplitude component MTF of an optical transfer function OTF and an explanatory diagram of a phase component PTF of the optical transfer function OTF, respectively. In FIG. 5A, a dashed line (A) denotes an MTF observed when an image is not restored, and a dashed-dotted line (B) denotes an MTF observed when the image is restored. Similarly, in FIG. 5B, a dashed line (A) denotes a PTF observed when an image is not restored, and a dashed-dotted line (B) denotes a PTF observed when the image is restored. As illustrated in FIG. 4A, the PSF observed when the image is not restored is asymmetrically spread. Because of this asymmetry, the phase component PTF has a value nonlinear to the frequency. In the image restoration processing, an image is corrected such that an amplitude component MTF is amplified to cause a phase component to be zero, which makes a point spread function PSF observed when the image is restored symmetrical and sharp-shaped.

As described above, an image restoration filter can be obtained by the reverse Fourier transform of a function designed based on an inverse function of an optical transfer function OTF of an image pickup optical system. The image restoration filter used in this embodiment can be changed as appropriate, and the Wiener filter described above, for example, can be used. When the Wiener filter is used, the reverse Fourier transform of M(u, v) represented by Expression (6) allows creation of an image restoration filter in a real space which is actually convolved with an image. An optical transfer function OTF varies depending on an image height of an image pickup optical system (a position in an image) even in one image pickup state. Thus, the image restoration filter is varied according to the image height when being used.

[Image Pickup Apparatus]

Referring to FIG. 1, an image pickup apparatus 200 including an image processing apparatus according to this embodiment of the present invention will be described. FIG. 1 is a configuration diagram of the image pickup apparatus 200. The image pickup apparatus 200 includes an installed image processing program performing image restoration processing of a shot image, and the image restoration processing is performed by an image processing circuit (image processing apparatus) 204 inside the image pickup apparatus 200.

The image pickup apparatus 200 includes an image pickup optical system (lens) 201 and an image pickup apparatus body (camera body). The image pickup optical system 201 includes a diaphragm 201a and a focus lens 201b, and is configured along with the image pickup apparatus body (camera body). However, the present invention is not limited to this, but can be applied to an image pickup apparatus where the image pickup optical system 201 is exchangeably attached to an image pickup apparatus body.

An image pickup element 202 is configured by a CCD or a CMOS sensor and photoelectrically converts an object image (imaging light) obtained through the image pickup optical system 201 to generate a shot image. In other words, the object image is converted into an analog signal (an electrical signal) by a photoelectrically conversion of the image pickup element 202. Subsequently, this analog signal is converted into a digital signal by an A/D convertor 203, and this digital signal is inputted to the image processing circuit 204.

The image processing circuit 204 performs predetermined processing and image restoration processing to the digital signal. As illustrated in FIG. 1, the image processing circuit 204 includes an image pickup condition obtaining circuit (first obtainer) 204a, an optical transfer function obtaining circuit (second obtainer) 204b, and a processing circuit (processor) 204c. The image pickup condition obtaining circuit 204a obtains an image pickup condition of the image pickup apparatus from a state detecting circuit 207. The image pickup condition is at least one of a diaphragm value, an image pickup distance or a focal length of a zoom lens. The state detecting circuit 207 may directly obtain the image pickup condition from a system controller 210 or may obtain the image pickup condition from an image pickup optical system control circuit 206.

An optical transfer function OTF or coefficient data required to generate the optical transfer function OTF is stored in a memory 208. The memory 208 is configured to, for example, a ROM. An output image processed by the image processing circuit 204 is stored in an image recording medium 209 as a predetermined format. An image generated by performing predetermined processing for display on the image processed by the image restoration processing is displayed on a display 205, which is configured to a liquid crystal monitor or an organic EL display. However, the image displayed on the display 205 is not limited this, and the display 205 may display an image processed by simple processing for high speed display.

The system controller 210 performs a series of controls in the image pickup apparatus 200. The system controller 210 causes the image pickup optical system control circuit 206 to mechanically drive the image pickup optical system 201. The image pickup optical system control circuit 206 controls an opening size of the diaphragm 201a to set an F-number. The image pickup optical system control circuit 206 also adjusts focus depending on an object distance and thereby controls a position of the focus lens 201b when an autofocus (AF) mechanism or a manual focus mechanism, which are not illustrated, is used. However, control of the opening size of the diaphragm 201a or a function of the manual focus may be not performed according to specifications of the image pickup apparatus 200.

An optical element such as a low-pass filter and an infrared cut filter may be arranged in the image pickup optical system 201, but an element, such as the low-pass filter, which influences characteristics of the optical transfer function OTF may be taken into consideration in the case of generating the image restoration filter. The infrared cut filter influences each point spread function (PSF) of an RGB channel which is an integral value of a spectral wavelength of the PSF, especially the PSF of an R channel, and thus may be taken into consideration in the case of generating the image restoration filter.

The image processing circuit 204 is configured to an application specific integrated circuit (an ASIC), and the image pickup optical system control circuit 206, the state detecting circuit 207, and the system controller 210 are each configured by a CPU or a MPU. Additionally, one or more of the image processing circuit 204, the image pickup optical system control circuit 206, the state detecting circuit 207, and the system controller 210 may be concurrently configured by the same CPU or the same MPU.

[First Embodiment]

Figure 6:
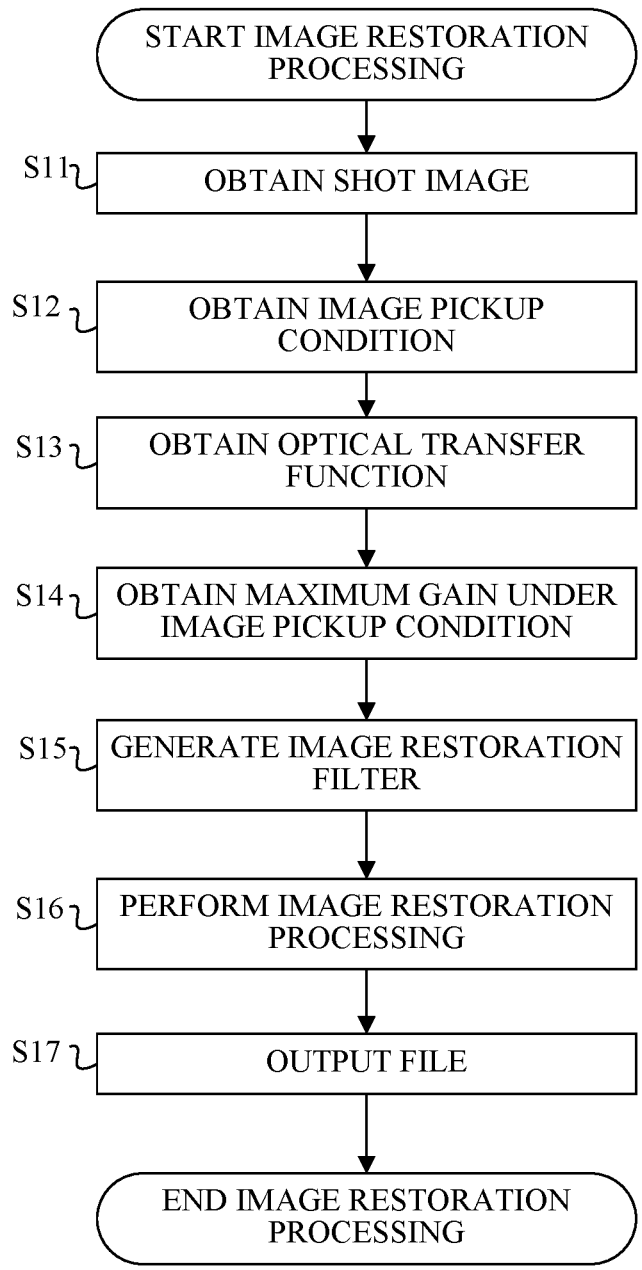
FIG. 6 is a flowchart of image restoration processing (first and second embodiments).

Referring to FIG. 6, image restoration processing in this embodiment will be described. FIG. 6 is a flowchart illustrating the image restoration processing. The flowchart of FIG. 6 is executed on the basis of instructions of the image processing circuit 204.

At step S11, a shot image is obtained. The memory 208 stores the shot image. An image stored in the image recording medium 209 may be obtained as the shot image.

At step S12, the image pickup condition obtaining circuit 204a obtains an image pickup condition. The image pickup condition is, for example, a focal length of the image pickup optical system 201, a diaphragm value, and an image pickup distance. The image pickup condition obtaining circuit 204a also obtains noise characteristics (for example, ISO sensitivity) while shooing at the same time. In the case of an image pickup apparatus where a lens is exchangeably attached to a camera body, the image pickup condition further includes a lens ID and a camera ID. The image pickup condition may be directly obtained from the image pickup apparatus or may be obtained from information attached to the image.

At step S13, the optical transfer function obtaining circuit 204b obtains an optical transfer function OTF suitable for the image pickup condition obtained at step S12. The optical transfer function OTF is selected in a plurality of optical transfer function OTFs previously stored. The optical transfer function OTF suitable for the image pickup condition may be also newly generated from a function to generate the optical transfer function OTF and a coefficient group used to generate it, which are previously stored. The optical transfer function OTF suitable for the image pickup condition may be further generated by interpolating processing using the previously stored optical transfer function OTF. In this case, data amounts of stored image restoration filter can be reduced. The interpolating processing may be, for example, bilinear interpolation (linear interpolation) and bi-cubic interpolation, but is not limited to them.

Figure 7:
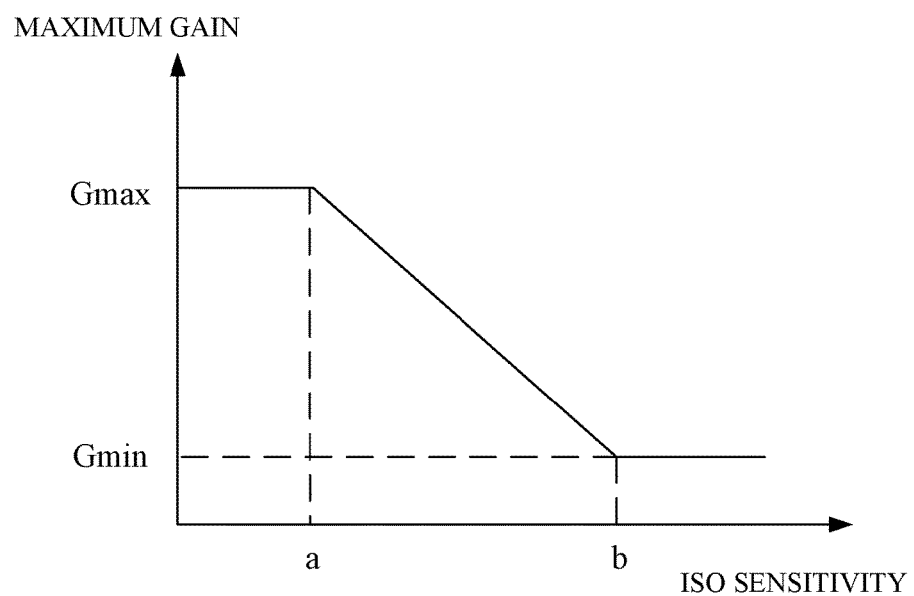
FIG. 7 is a graph representing a relationship between ISO sensitivity and a maximum gain (first embodiment).

At step S14, a maximum gain applicable while shooting is obtained from a characteristic table of FIG. 7 stored in the memory 208 according to ISO sensitivity of the image pickup condition obtained at step S12. FIG. 7 illustrates one example of a graph representing a relationship between the ISO sensitivity and the maximum gain. In FIG. 7, an abscissa axis is the ISO sensitivity, and an ordinate axis is the maximum gain. In the characteristic table of FIG. 7, a maximum gain Gmax acceptable in the system, a minimum gain Gmin required to create an effect, and ISO sensitivity a and b that switching these values are set, and ISO sensitivity between the ISO sensitivity a and b is linearly interpolated.

In image restoration processing, restoration filter characteristics is required to calculate using an expression as the Wiener filter represented by Expression (6). The restoration filter characteristics are normally calculated by determining the constant C in Expression (6). However, when the image pickup apparatus 200 is used, an S/N ratio of an output image may be varied according to a reading method of the image pickup element 202. Representative factor which varies the S/N ratio is a setting of ISO sensitivity. The setting of ISO sensitivity is, for example, a setting where an image having desired brightness can be obtained by applying a gain to an image signal using the image pickup element 202 and the A/D convertor 203 when a dark object is shot at a predetermined diaphragm value and a predetermined shatter speed. Increasing the gain amplifies a noise signal superimposed on the shot image, and the output image becomes a rough image where a noise is conspicuous. The S/N ratio may vary depending on a driving method, such as a long photographing and a moving picture photographing, other than the setting of ISO sensitivity, but, for simplification, the method setting the ISO sensitivity will be described in this embodiment. When the ISO sensitivity is varied, using the constant C in Expression (6) determined under a predetermined condition may cause the image restoration filter to be applied to an image having an S/N ratio worse than that under a presupposed condition. Then, the image restoration filter amplifies noises and this is unfavorable to the shot image. Thus, it is favorable that a maximum filter settable in the image restoration filter is determined according to the ISO sensitivity.

In this embodiment, the case that the ISO sensitivity and the characteristic table are stored is described, but the maximum gain may be calculated by assuming noise components of an image from an OB (Optical Black) region of the shot image. In this case, the memory 208 stores a table where an abscissa axis is an S/N ratio of a shot image and an ordinate axis is a maximum gain. When a driving method, such as a long photographing and a moving picture photographing, is changed, the maximum gain is obtained using the same method.

At step S15, the processing circuit 204c generates an image restoration filter having gain characteristics according to the ISO sensitivity using the optical transfer function OTF of the image pickup optical system 201. The generated image restoration filter is obtained on the basis of characteristics of the optical transfer function OTF in view of noise characteristics of the image pickup element 202.

Figure 8A:
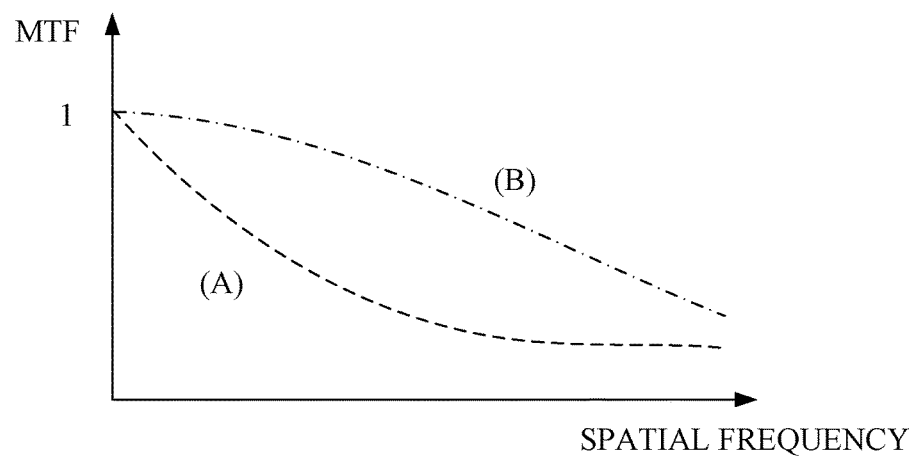
FIGS. 8A to 8C are graphs for an explanation of the maximum gain (first embodiment).
Figure 8B:
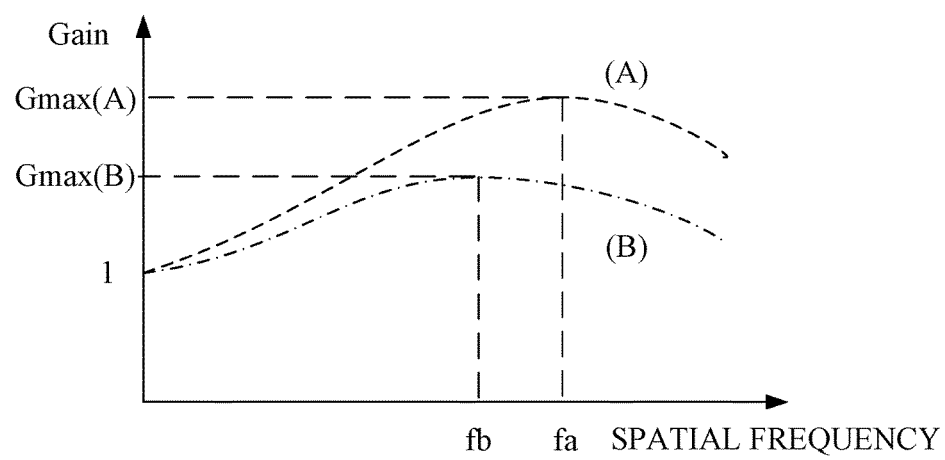

Here, referring to FIGS. 8A to 8C, a generating method of the image restoration filter will be described. FIG. 8A is a graph representing MTF characteristics of optical characteristics (A) and (B) different from each other. In FIG. 8A, an abscissa axis is a spatial frequency and an ordinate axis is an amplitude characteristic (MTF). FIG. 8B is a graph representing gain characteristics of the image restoration filter generated using the Wiener filter represented by Expression (6). In FIG. 8B, an abscissa axis is a spatial frequency and an ordinate axis is a gain. In Expression (6), the constant C is set to decrease the gain on a high frequency side, but, as illustrated in FIG. 8B, a decreasing trend of the gain is different according to origin optical characteristics. In FIG. 8B, in the case of the optical characteristic (A), the maximum gain is Gmax(A) at the frequency fa, and in the case of the optical characteristic (B), the maximum gain is Gmax(B) at the frequency fb. Then, the gain decreases on the high frequency side, but the maximum gain is influenced by the origin optical characteristics. Thus, controlling an influence of noise amplification of the finally obtained image is difficult.

Figure 8C:
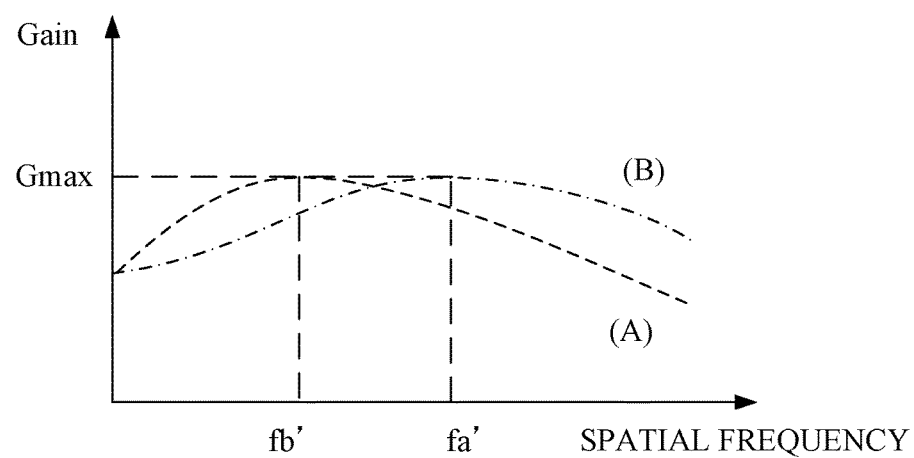

In this embodiment, as illustrated in FIG. 8C, the maximum gain is set to a predetermined value not to be influenced by the original optical characteristics. In FIG. 8C, each maximum gain of the optical characteristics (A) and (B) is Gmax, and a gain is set not to be larger than Gmax in all frequency bands. To realize such characteristics, in the following Expression (7), a function F(α) limiting the maximum gain is used instead of the constant C in Expression (6).

$$M(u, v) = \frac{1}{H(u, v)} \frac{|H(u, v)|^2}{|H(u, v)|^2 + F(\alpha)} \quad (7)$$

A symbol α is a variable to limit the maximum gain. Expression (7) is one example to limit the maximum gain, and the maximum gain may be limited to the other expression or the other means.

In this embodiment, an influence on a noise can be controlled by generating the image restoration filter where the maximum gain is limited. In other words, when noise characteristics of the image pickup apparatus 200 are previously known, determining the symbol α in Expression (7) according to the noise characteristics can generate an optimum image restoration filter independent of the original optical characteristics.

At step S16, the image processing circuit 204 performs image restoration processing of the shot image using the image restoration filter generated at step S15. In other words, the image restoration processing of the shot image is performed by convolving the image restoration filter with the shot image.

At step S17, a restoration image (an output image) is outputted on the basis of a result of the image restoration processing at step S16.

[Second Embodiment]

In the first embodiment, limiting the maximum gain according to the image pickup condition to generate the filter was explained. In FIG. 8C, in the optical characteristic (A), the gain reaches the maximum gain at a frequency fb', and in the optical characteristic (B), the gain reaches the maximum gain at a frequency fa'. The noise in the image pickup element 202 mainly has a random component and thus a frequency near the Nyquist frequency is dominant in a frequency of the noise. The method explained in the first embodiment can control the maximum gain in all frequency bands, but generating a particularly controlled filter relative to a target noise more effectively suppresses noises.

Image restoration processing in this embodiment is performed along the flow of FIG. 6. In this embodiment, at step S15, a frequency of the target noise is particularly controlled compared to the first embodiment to generate image restoration filter. The other steps are identical with that in the first embodiment, and their explanations are omitted. The flowchart of FIG. 6 is executed on the basis of instructions of the image processing circuit 204 as the first embodiment.

Figure 9A:
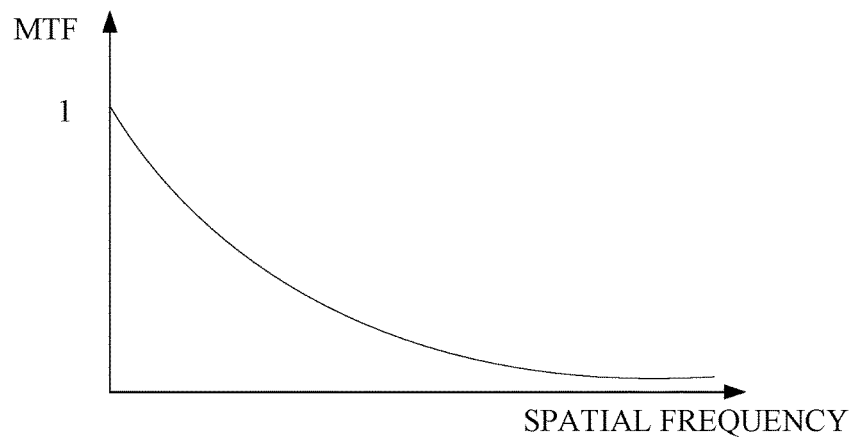
FIGS. 9A to 9C are graphs for an explanation of weighting target frequency for each frequency (second embodiment).
Figure 9B:
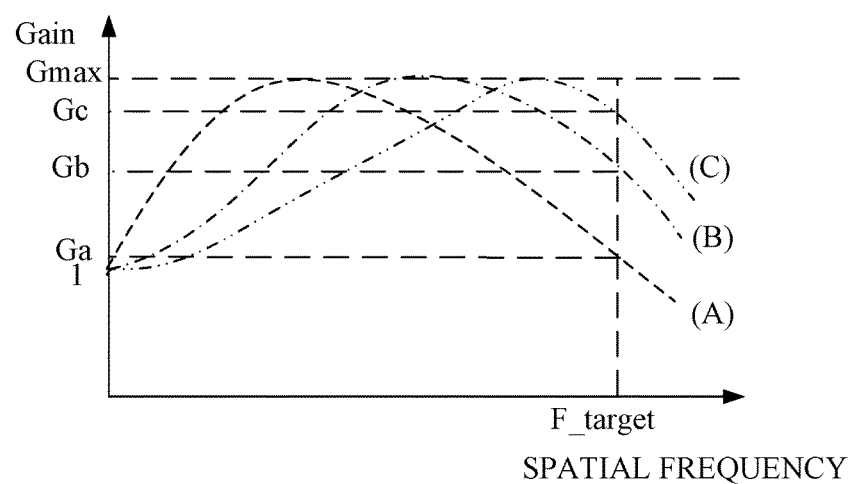
Figure 9C:
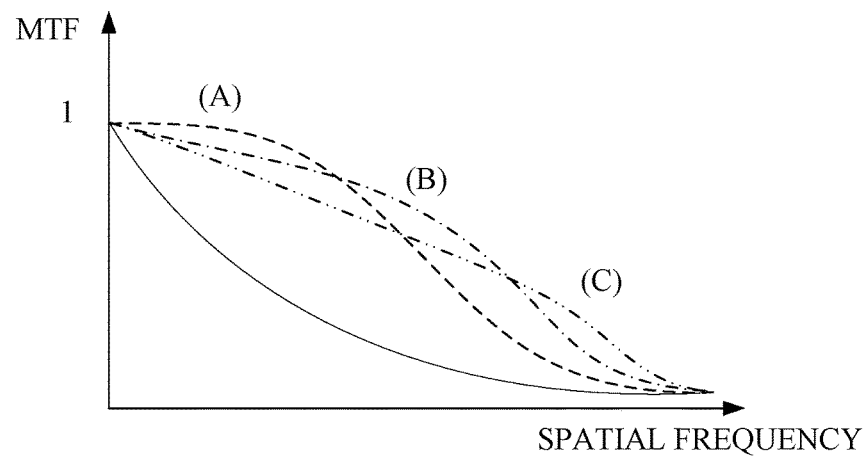

FIG. 9A to 9C are graphs for an explanation of weighting target frequency for each frequency. FIG. 9A is a graph representing MTF characteristics of predetermined optical characteristics. FIG. 9B is a graph representing gain characteristics of an image restoration filter in the case of where the characteristics of FIG. 9A is limited by a maximum gain Gmax. The image restoration filters (A) to (C) are generated by varying a weighting frequency. The image restoration filter (A) most emphasizes a low frequency, followed by the image restoration filter (B), and the image restoration filter (C) most emphasizes a high frequency. Such image restoration filters may be previously set, and may be automatically generated using the following Expression (8) with dynamic parameters.

$$M(u, v) = \frac{1}{H(u, v)} \frac{|H(u, v)|^2}{|H(u, v)|^2 + F(Gmax)} G(u, v) \quad (8)$$

In Expression (8), a function Gmax is used instead of the symbol α in Expression (7), and a function G(u,v) weighting for each frequency is added. If the same thing can be realized without using the above Expression, the other expressions and the other methods may be used.

FIG. 9C is a graph representing variations of the MTF characteristics when the image restoration processing is performed using each image restoration filter of FIG. 9B. Using the image restoration filter (A) boosts the MTF on the lowest frequency side compared to the original characteristics, and using the image restoration filter (C) boosts the MTF on the highest frequency side compared to the original characteristics.

When a target frequency F_target is determined, the gain applying to the frequency F_target can be obtained from gain characteristics of the image restoration filter generated by varying the function G(u,v). In FIG. 9B, gains applying to the frequency F_target of the image restoration filters (A), (B) and (C) are respectively Ga, Gb and Gc. Thus, previously limiting the maximum gain applying to the frequency F_target using noise characteristics of the image pickup element 202 can generate the image restoration filter capable of further particularly accurately controlling reduction of noises. In this case, since extremely weighting a low band or a high band may generate a harmful effect such as ringing, the function G(u,v) is required to be previously limited within an optimum region. Furthermore, when the gain characteristics extremely decrease (especially, are less than 1), the image blurs due to the LPF effect, and thus both the maximum and minimum gains are favorably limited.

[Third Embodiment]

In the first and second embodiments, the method generating the image restoration filter by performing the reverse Fourier transform with respect to the obtained optical transfer function OTF was explained. Ideally, processing is desirably performed in the frequency region as the first and second embodiments. However, since the reverse Fourier transform is required, a calculation speed of the image pickup apparatus 200 and a production cost are inappropriate, and performing the reverse Fourier transform may be difficult. In this case, the reverse Fourier transform may be previously performed outside the apparatus and a spatial filter of the calculated result may be stored in the memory 208. Then, the image restoration processing is performed by extracting the image restoration filter suitable for the image pickup condition. Spatial filters, which is necessary for noise countermeasures, for each combination of the image pickup condition and the maximum gain are required to be previously calculated, and thus a memory quantity of the memory 208 becomes enormous.

Figure 10:
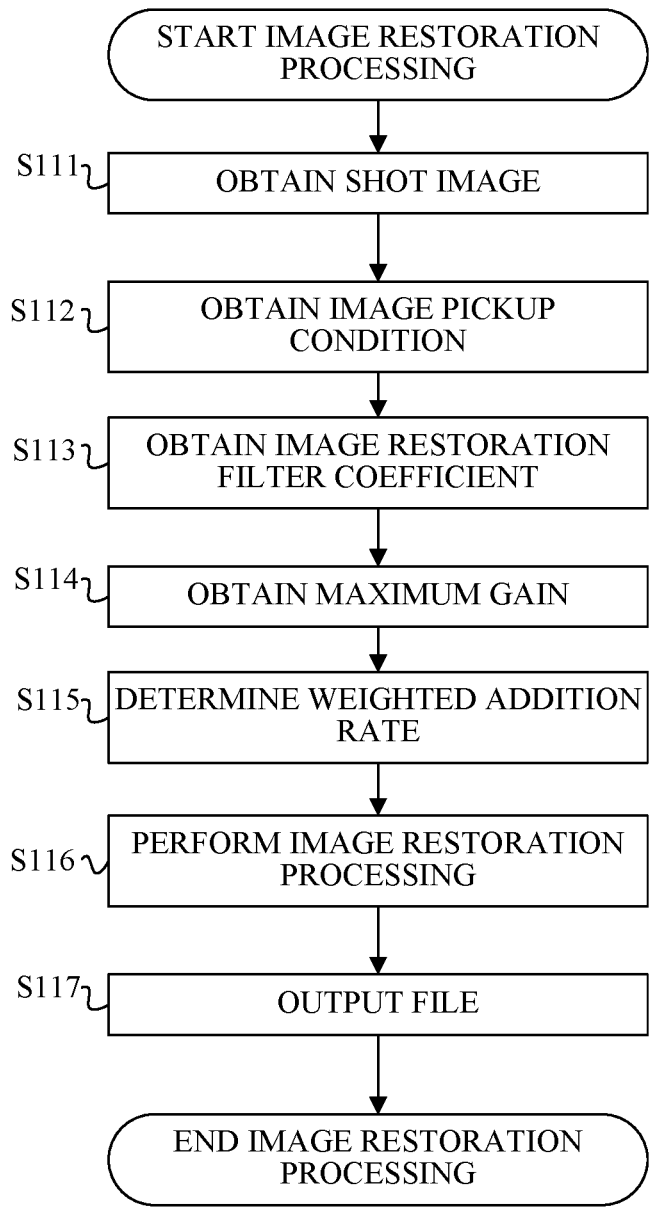
FIG. 10 is a flowchart of image restoration processing (third embodiment).

In this embodiment, when the image restoration filter is obtained from the memory 208, noise countermeasures is performed while minimally suppressing a capacity which the memory 208 stores. Referring to FIG. 10, image restoration processing in this embodiment will be described. FIG. 10 is a flowchart of the image restoration processing in this embodiment. The flowchart of FIG. 10 is executed on the basis of the instructions of the image processing circuit 204.

Steps S111 and S112 are each identical with steps S11 and S12 of FIG. 6, and thus these explanations are omitted.

At step S113, an image restoration filter is obtained according to the image pickup condition obtained from the memory 208 at step S112. In the first embodiment, the optical transfer function OTF is obtained, but in this embodiment, the image restoration filter generated by performing the reverse Fourier transform with respect to the optical transfer function OTF is obtained as described above. As the image restoration filter under the image pickup condition not stored, the image restoration filter near the image restoration filter not stored may be used, and may be generated on the basis of an interpolation using surrounding image restoration filters.

Figure 11A:
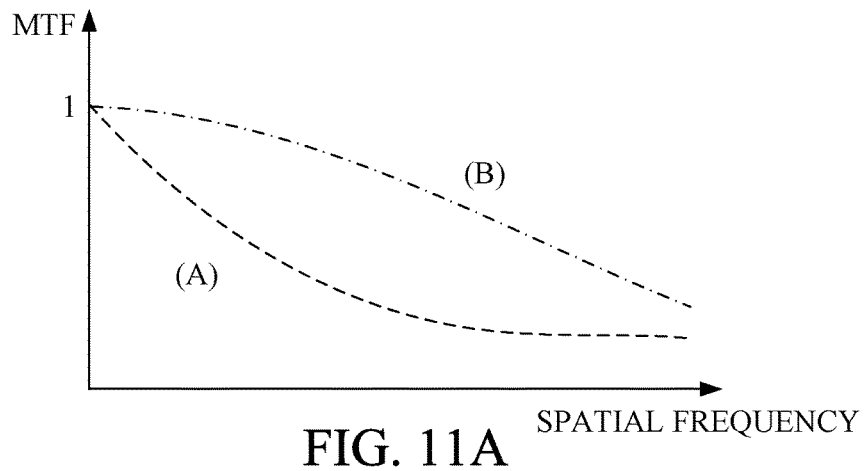
FIGS. 11A and 11B are graphs for an explanation of a maximum gain (third embodiment).
Figure 11B:
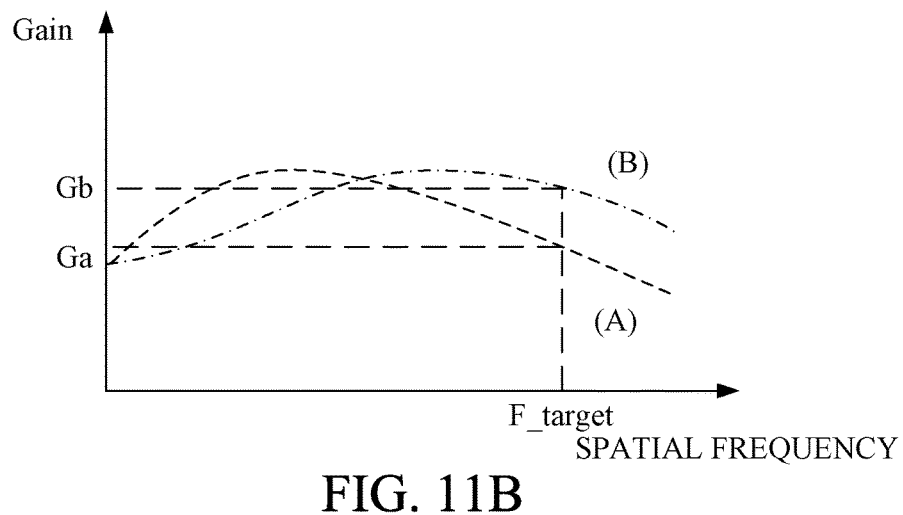

At step S114, a maximum gain of the image restoration filter obtained at step S113 is obtained from the memory 208. Referring to FIGS. 11A and 11B, the maximum gain will be described. FIG. 11A is a graph representing amplitude characteristics of optical characteristic (A) and (B) different from each other, and FIG. 11B is a graph representing a maximum gain of the optical characteristics (A) and (B). In the optical characteristic (A), the maximum gain is Ga, and in the optical characteristic (B), the maximum gain is Gb. When the image restoration filters of the optical characteristics (A) and (B) are generated in the outside, a gain of a previously set target frequency (F_target) linked to the image restoration filter is stored in the memory 208. Thereby, gain characteristics on the frequency space which are not determined using only the image restoration filter can be checked afterward. Only one information for one optical characteristic is required and is negligible size, and thus an influence on the memory 208 is extremely small. When the image restoration filter is not stored, the maximum gain may be a value near the image restoration filter and may be generated by an interpolation using surrounding maximum gains.

Figure 12:
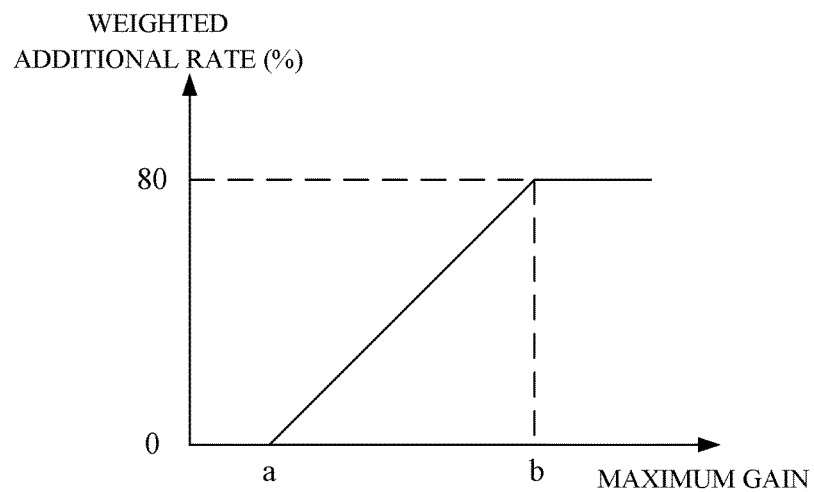
FIG. 12 is a graph representing a relationship between the maximum gain and a weighted addition rate (third embodiment).

At step S115, a weighted addition rate is obtained using the image pickup condition obtained at step S112 and the maximum gain obtained at step S114. Referring to FIG. 12, one example of determination methods of the weighted addition rate will be described. FIG. 12 is a graph representing a weighted addition rate with respect to maximum gain information of predetermined ISO sensitivity. In FIG. 12, when the maximum gain is smaller than the maximum gain a, the weighted addition rate is 0%, that is, an image corrected using the image restoration filter is finally output. Meanwhile, when the maximum gain is larger than a maximum gain b, the weighted addition rate is 80%, that is, weighted average is performed at a ratio of the image before the correction of 80% and the image after the correction of 20%. Thus, in the case of a region where a gain is high, using many origin signals before the correction can simply reduce worsening of noises. This table is required for each settable ISO sensitivity, but the maximum gain and a tilt between the maximum gains a and b, which are representative conditions, may be had to generate a table of remaining ISO sensitivity using an appropriate numerical operation. Thus, processing, which is cannot be performed on the frequency space, can be simply realized while minimally suppressing consumption of the memory. However, in this embodiment, an example of ISO sensitivity was described, the same thing as the first and second embodiments may be performed by estimating a noise quantity from an image.

The present invention can be also realized by performing the following processing. The processing is that a system or a computer (or a CPU or a MPU) of an apparatus reads out a software (a program), which realizes functions of each embodiment and is provided to the system or the apparatus through a network and various recording medium, to execute the software.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-162363, filed on Aug. 20, 2015, which is hereby incorporated by reference herein in its entirety.

What is claimed is:

1. An image processing apparatus comprising:
a processor that
obtains an image pickup condition of a shot image,
generates an image restoration filter based on an optical transfer function according to the image pickup condition, and
performs image processing on the shot image using restoration filter,
wherein the processor changes a maximum gain of the image restoration filter on the basis of information on noise characteristics of the shot image.

2. The image processing apparatus according to claim 1, wherein the processor generates the image restoration filter to prevent the maximum gain based on the information on noise character from exceeding a predetermined value.

3. The image processing apparatus according to claim 1, wherein the processor generates the image restoration filter to prevent the maximum gain relative to a specific frequency based on the information on noise characteristics from exceeding a predetermined value.

4. The image processing apparatus according to claim 1, wherein the information on noise characteristics is ISO sensitivity.

5. The image processing apparatus according to claim 1, wherein the information on noise characteristics is based on an image from an Optical Black region of the shot image.

6. image pickup apparatus comprising:
an image sensor that generates a shot image; and
a processor that
obtains an image pickup condition of the shot image,
generates an image restoration filter based on an optical transfer function according to the image pickup condition, and
performs image processing on the shot image using the image restoration filter,
wherein the processor changes a maximum gain of the image restoration filter on the basis information on noise characteristics of the shot image.

7. A non-transitory computer-readable storage medium configured to store a computer program that enables a computer to function as the processor of the image processing apparatus according to claim 1.

8. An image processing method comprising the steps of:
obtaining an image pickup condition of a shot image;
generating an image restoration filter based on the optical transfer function according to the image pickup condition; and
performing image processing on the shot image using the image restoration filter,
wherein a maximum gain of the image restoration filter is changed on the basis of information on noise characteristics of the shot image.

9. An image processing apparatus comprising:
a processor that
obtains an image pickup condition of a shot image,
obtains an image restoration filter based on an optical transfer function according to the image pickup condition, and
performs image processing on the shot image using the image restoration filter,
wherein the processor adds an image corrected using the image restoration filter to the shot image at a weighted addition rate on the basis of information on noise characteristics of the shot image.

10. The image processing apparatus according to claim 9, wherein the processor obtains a gain relative to a specific frequency corresponding to the image restoration filter, and
wherein the processor adds an image corrected using the image restoration filter to the shot image at the weighted addition rate on the basis of the information on noise characteristics and the gain.

11. The image processing apparatus according to claim 10,
wherein the processor does not add the image corrected using the image restoration filter to the shot image, in a case where the gain is smaller than a predetermined value on the basis of the information on noise characteristics.

12. The image processing apparatus according to claim 9, wherein the information on noise characteristics is ISO sensitivity.

13. The image processing apparatus according to claim 9, wherein the information on noise characteristics is based on an image from an Optical Black region of the shot image.

14. An image pickup apparatus comprising:
an image sensor that generates a shot image; and
a processor that
obtains an image pickup condition of the shot image,
obtains an image restoration filter based on an optical transfer function according to the image pickup condition, and
performs image processing on he shot image using the image restoration filter,
wherein the processor adds an image corrected using the image restoration filter to the shot image at a weighted addition rate on the basis of information on noise characteristics of the shot image.

15. An image processing method comprising the steps of,
obtaining an image pickup condition of a shot image;
generating an image restoration filter based on an optical transfer function according to the image pickup condition; and
performing image processing on the shot image using the image restoration filter,
wherein an image corrected using the image restoration filter is added to the shot image at a weighted addition rate on the basis of information on noise characteristics of the shot image.

16. The image processing apparatus according to claim 1, wherein gain characteristics of the image restoration filter can be expressed as $$M(u, v) = \frac{1}{H(u, v)} \frac{|H(u, v)|^2}{|H(u, v)|^2 + F(\alpha)},$$

where M(u, v) is a gain of the image restoration filter for each frequency, |H(u, v)| is an absolute value of the optical transfer function for each frequency, and F(α) is a function limiting the maximum gain.

17. The image processing apparatus according to claim wherein gain characteristics of the image restoration filter can be expressed as $$M(u, v) = \frac{1}{H(u, v)} \frac{|H(u, v)|^2}{|H(u, v)|^2 + F(Gmax)} G(u, v),$$

where M(u, v) is a gain of the image restoration filter for each frequency, |H(u, v)| is an absolute value of the optical transfer function for each frequency, F(Gmax) is a function of the maximum gain, and G(u, v) is a function weighting for each frequency.

18. An image processing apparatus comprising:
a processor that
obtains an image pickup condition of a shot image,
generates an image restoration filter based on an optical transfer function according to the image pickup condition, and
performs image processing on the shot image using the image restoration filter,
wherein gain characteristics of the image restoration filter can be expressed as $$M(u, v) = \frac{1}{H(u, v)} \frac{|H(u, v)|^2}{|H(u, v)|^2 + F(\alpha)},$$

where M(u, v) is a gain of the image restoration filter for each frequency, |H(u, v)| is an absolute value of the optical transfer function for each frequency, and F(α) is a function limiting the maximum gain corresponding to noise characteristics of the shot image.

19. An image processing apparatus comprising:
a processor that
obtains an image pickup condition of a shot image,
generates an image restoration filter based on an optical transfer function according to the image pickup condition, and
performs image processing on the shot image using the image restoration filter,
wherein gain characteristics of the image restoration filter can be expressed as $$M(u, v) = \frac{1}{H(u, v)} \frac{|H(u, v)|^2}{|H(u, v)|^2 + F(Gmax)} G(u, v),$$

where M(u, v) is a gain of the image restoration filter for each frequency, |H(u, v)| is an absolute value of the optical transfer function for each frequency, F(Gmax) is a function of the maximum gain corresponding to noise characteristics of the shot image, and G(u, v) is a function weighting for each frequency.

20. An image processing method comprising the steps of:
obtaining an image pickup condition of a shot image,
generating an image restoration filter based on an optical transfer function according to the image pickup condition, and
perform image processing on the shot image using the image restoration filter,
wherein gain characteristics of the image restoration filter can be expressed as $$M(u, v) = \frac{1}{H(u, v)} \frac{|H(u, v)|^2}{|H(u, v)|^2 + F(\alpha)},$$

where M(u, v) is a gain of the image restoration filter for each frequency, |H(u, v)| is an absolute value of the optical transfer function for each frequency, and F(α) is a function limiting the maximum gain corresponding to noise characteristics of the shot image.

21. An image processing method comprising the steps of:
obtaining an image pickup condition of a shot image,
generating an image restoration filter based on an optical transfer function according to the image pickup condition, and
performing image processing on the shot image using the image restoration filter,
wherein gain characteristics of the image restoration filter can be expressed as $$M(u, v) = \frac{1}{H(u, v)} \frac{|H(u, v)|^2}{|H(u, v)|^2 + F(Gmax)} G(u, v),$$

where M(u, v) is a gain of the image restoration filter for each frequency, |H(u, v)| is an absolute value of the optical transfer function for each frequency, F(Gmax) is a function of the maximum gain corresponding to noise characteristics of the shot image, and G(u, v) is a function weighting for each frequency.

* * * * *